March 20, 1956 L. S. LONGENECKER 2,738,744

FURNACE REFRACTORY STRUCTURE AND MOUNTING

Filed May 20, 1953 6 Sheets-Sheet 1

INVENTOR.
Levi S. Longenecker

BY Green, McCallister & Miller

HIS ATTORNEYS

March 20, 1956 L. S. LONGENECKER 2,738,744

FURNACE REFRACTORY STRUCTURE AND MOUNTING

Filed May 20, 1953 6 Sheets-Sheet 2

INVENTOR.
Levi S. Longenecker
BY Green, McCallister & Miller
HIS ATTORNEYS

FURNACE REFRACTORY STRUCTURE AND MOUNTING

Filed May 20, 1953 6 Sheets-Sheet 3

INVENTOR.
Levi S. Longenecker
BY Green, McCallister & Miller
HIS ATTORNEYS

FURNACE REFRACTORY STRUCTURE AND MOUNTING

INVENTOR.
Levi S. Longenecker
BY Green, McCallister & Miller
HIS ATTORNEYS

FURNACE REFRACTORY STRUCTURE AND MOUNTING

Filed May 20, 1953

6 Sheets-Sheet 5

INVENTOR.
Levi S. Longenecker
BY Green, McCallister & Miller
HIS ATTORNEYS

March 20, 1956 L. S. LONGENECKER 2,738,744

FURNACE REFRACTORY STRUCTURE AND MOUNTING

Filed May 20, 1953 6 Sheets-Sheet 6

INVENTOR.
Levi S. Longenecker
BY Green, McCallister & Miller
HIS ATTORNEYS

United States Patent Office 2,738,744

Patented Mar. 20, 1956

2,738,744

FURNACE REFRACTORY STRUCTURE AND MOUNTING

Levi S. Longenecker, Mount Lebanon, Pa.

Application May 20, 1953, Serial No. 356,227

20 Claims. (Cl. 110—99)

This invention relates to an improved furnace refractory construction and mounting structure and particularly, to a suspended nose and supported wall of refractory block construction for furnaces subjected to relatively high temperatures. The invention also relates to an improved refractory block construction, to an improved support or suspension hanger therefor, and to an improved structural assembly for mounting, supporting and suspending refractory blocks.

The refractory block mounting structure of my present invention is constructed especially for utilization in connection with so-called basic refractory bricks or blocks containing chrome or magnesite or both of them. Such blocks may be used in an unburned or burned state and may be clad or plated around their sides with metal. The metal cladding may be in the form of rolled steel plate or sheet, malleable iron or other suitable metal, especially ferrous metal; it serves to provide an oxidizable seal for joints between adjacent or abutting blocks as well as to strengthen and lengthen the life of the blocks. Blocks of this type are used in high temperature portions of metal melting and conditioning furnaces.

Previous to my present invention, considerable difficulty had been encountered in providing a good type of mounting for so-called high temperature basic blocks and this is particularly true from the standpoint of their more rigid mounting construction requirements. Previous to my invention, it had been customary to employ an individual refractory or metal socket centrally within the top or outer end of a basic refractory block. If a metal socket is employed, it is inset and secured in position by molding the block material about it. Individual rod hangers are then suspended from overhead or support beams and are secured to the socket to thereby suspend an individual block from substantially its axial center. Such a construction has a number of disadvantageous features. In the first place, it is highly expensive, necessitates a large number of individual hanger elements, and in the second place, the high heat to which the block is subjected may result in a spalling away of its socket-securing, molded-in projections and a distortion of the metal socket, if used, to cause it to break away and release the block after a relatively short period of usage. Also, if the block is provided with a clad metal coating, such coating adds to the weight of the construction without directly contributing to the security of its mounting.

Also prior mounting constructions have limited a desired shaping of roof, nose and wall portions of a furnace and have in general, made the nose portion of the furnace the shortest lived and weakest portion.

It has been an object of my invention to provide a new and improved furnace refractory structure and mounting which is particularly suitable for high temperature utilizations.

Another object of my invention has been to provide an improved form of refractory block or brick construction having an increased operative life and so designed as to enable the employment of a simplified and more effective mounting thereof.

A further object of my invention has been to provide a furnace structure which is suitable for utilization in connection with a suspended nose, supported side or apron walls, and a suspended roof and which more readily lends itself to a desired overall furnace construction in the sense that it is highly adaptable in its mounting utilization, support or suspension.

A still further object of my invention has been to provide a hanger construction which not only facilitates block mounting, but also makes possible an effective row mounting of refractory blocks as distinguished from an individual mounting thereof.

These and many other objects of my invention will appear to those skilled in the art from the drawings and the hereinafter set forth detailed description.

In the drawings:

in Figure 6, the block has been turned 90° clockwise with respect to the block of Figure 5;

Figures 1, 1A, 1B:
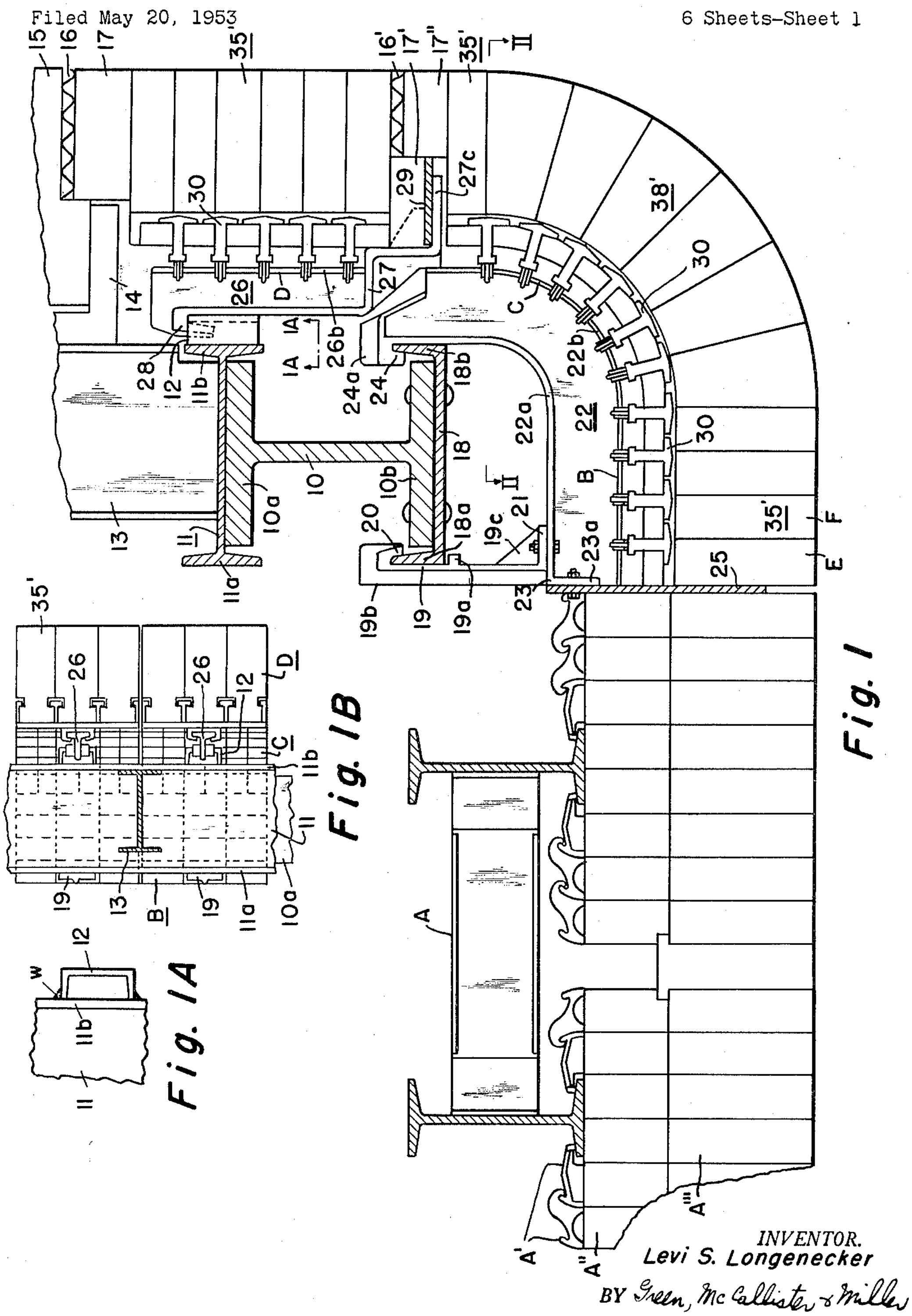
Figure 1 is a somewhat fragmental side view in elevation and partial section showing a furnace construction of my invention and further showing its adaptability for utilization with a fire-brick refractory roof.
Figure 1A is a horizontal section taken along the line IA—IA of Figure 1 and illustrating a detail of my mounting structure.
Figure 1B is a greatly reduced, fragmental top plan view illustrating how adjacent longitudinal line groups of refractory blocks may be mounted in accordance with my invention.
Figure 2:
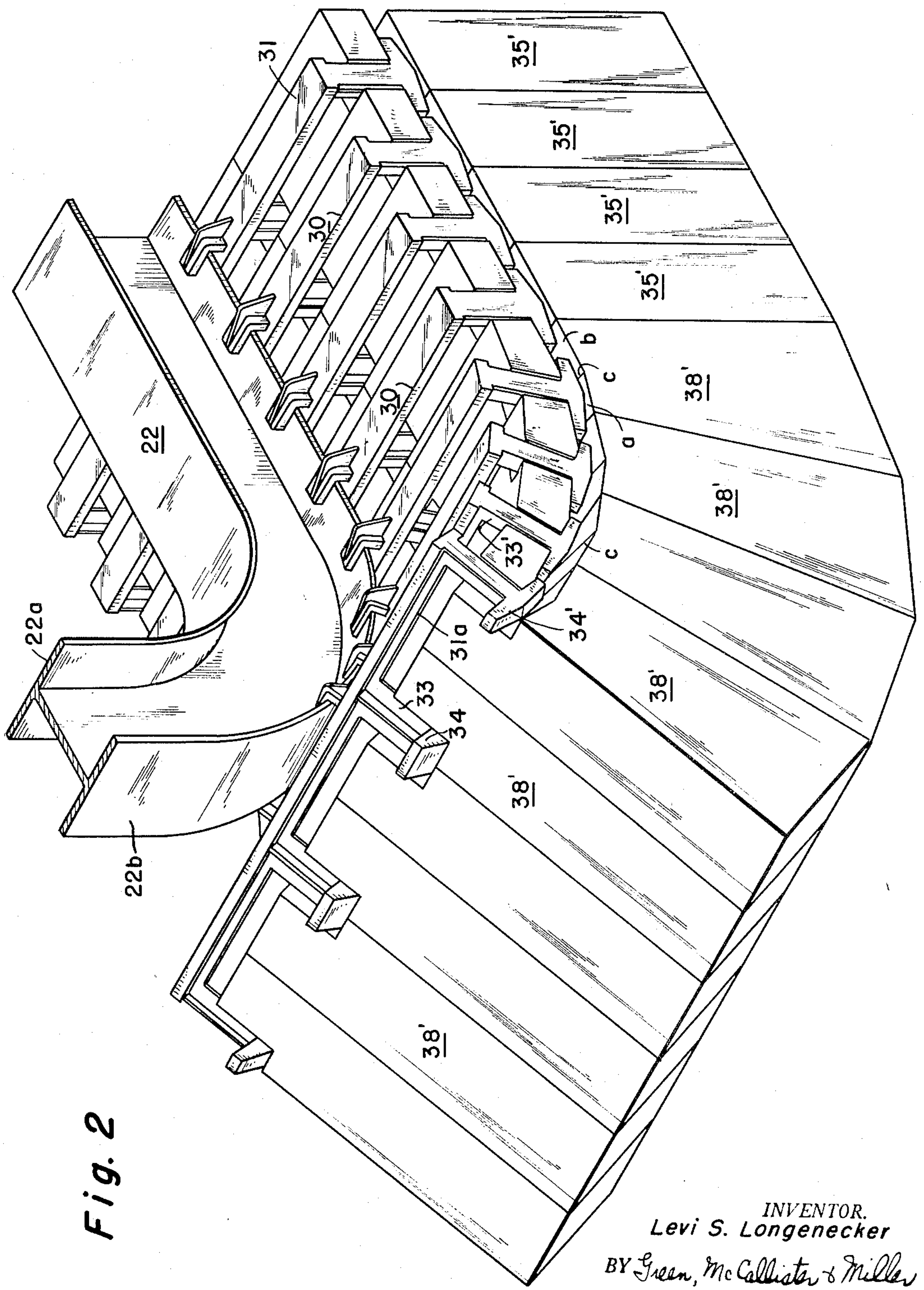
Figure 2 is an enlarged perspective view in elevation taken in the general direction of the line II—II of Figure 1 and illustrating nose portions of my construction.
Figures 3, 4, 5, 6:
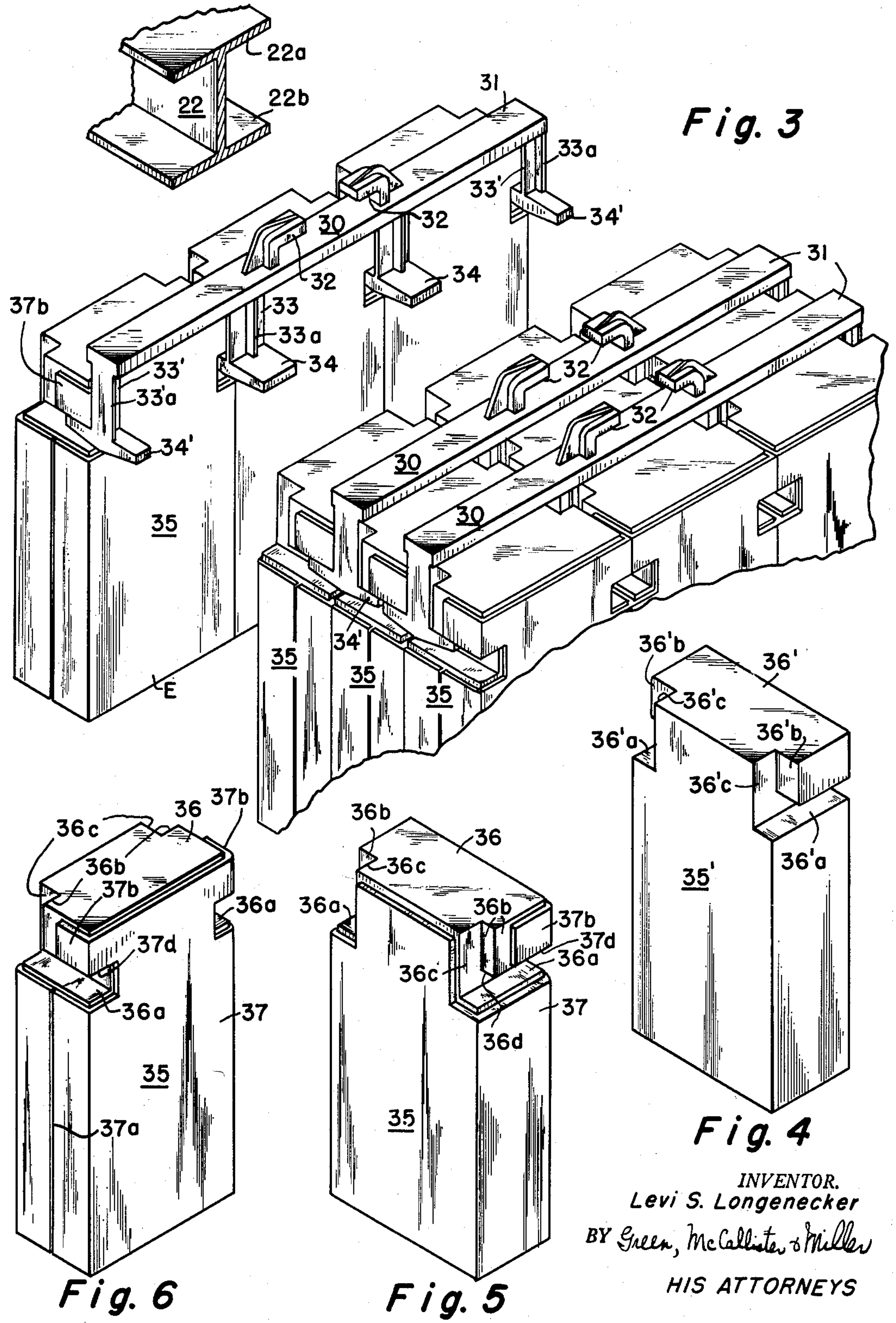
Figure 3 is an exploded perspective view in elevation on the same scale as Figure 2, particularly illustrating how refractory blocks of my construction may be assembled in spiked-together, tranversely-projecting, line rows on a longitudinal course for mounting on a common I-beam shaped member, by means of my improved hanger construction.
Figure 4 is a perspective view in elevation on the same scale as Figure 3 of a rectangular refractory block constructed in accordance with my invention; this shape of block is suitable for use in making a side or apron wall portion or a roof section of a nose portion.
Figures 5 and 6 are perspective views on the same scale as Figure 4 illustrating a clad rectangular block of my invention.
Figure 7:
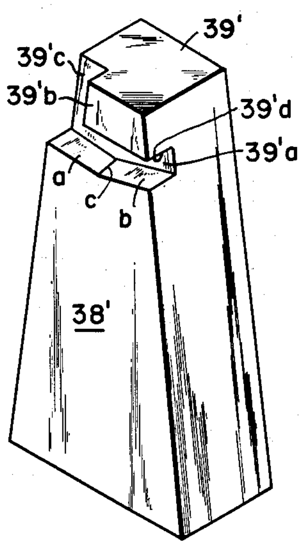
Figure 8:
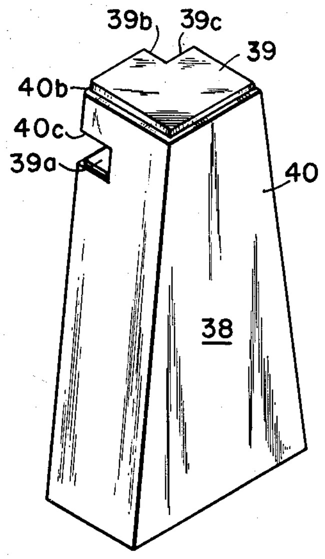
Figure 10:
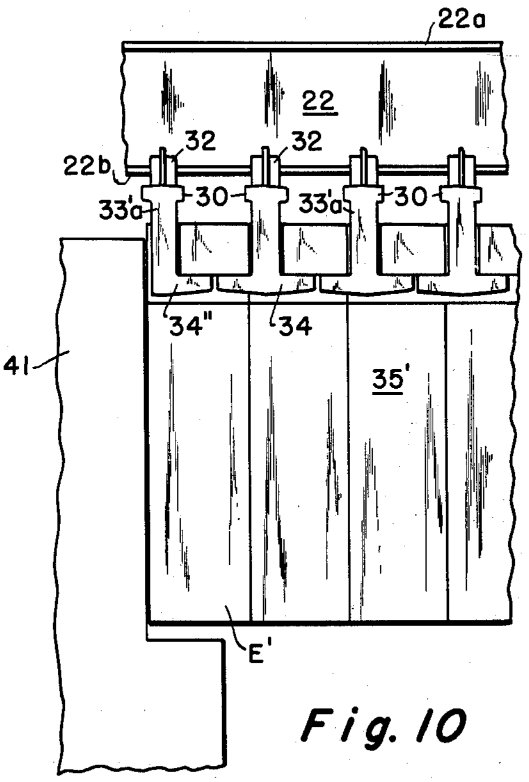
Figure 9:
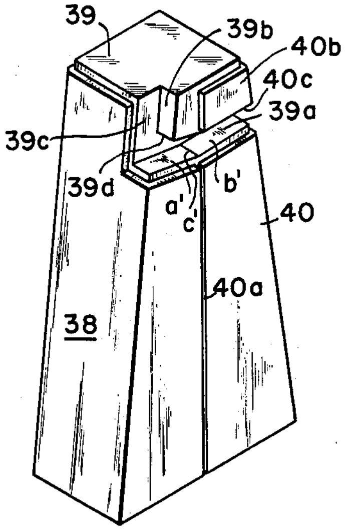
Figure 13:
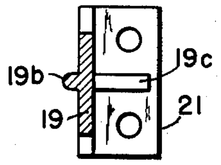
Figure 11:
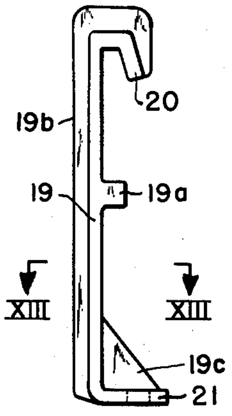
Figure 12:
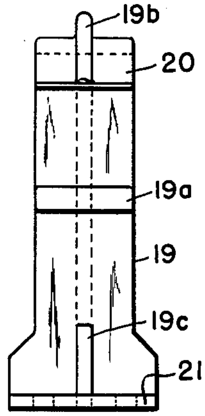
Figure 16:
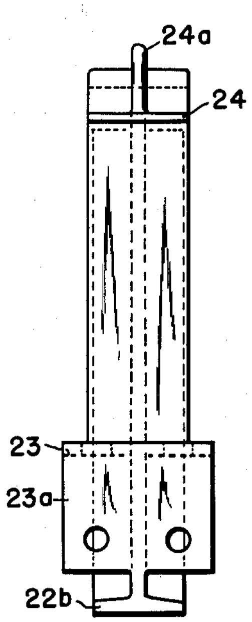
Figure 14:
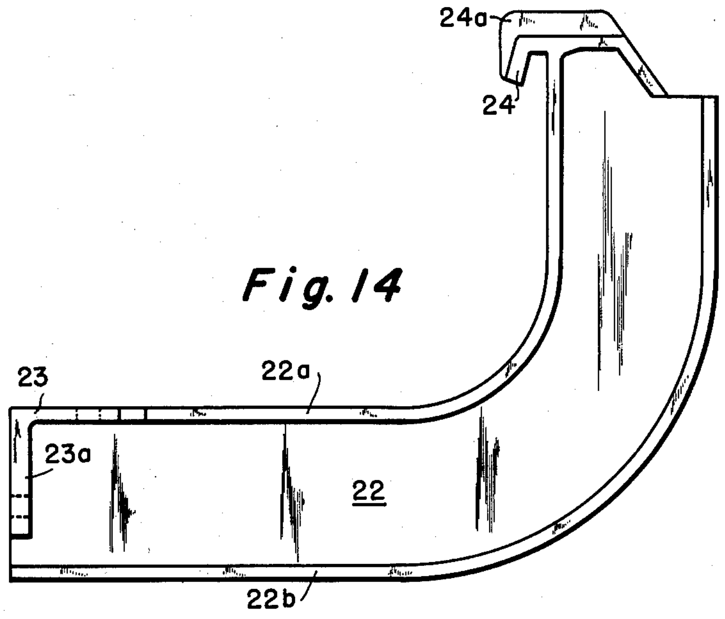
Figure 15:
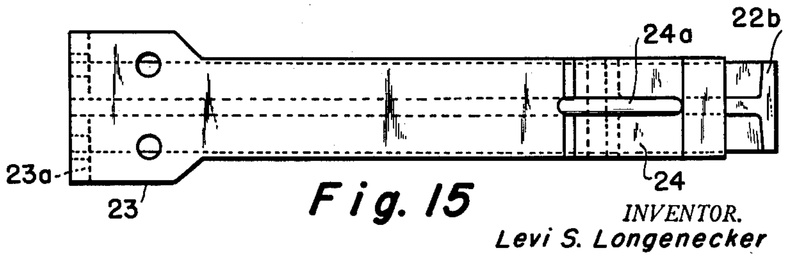
Figure 19:
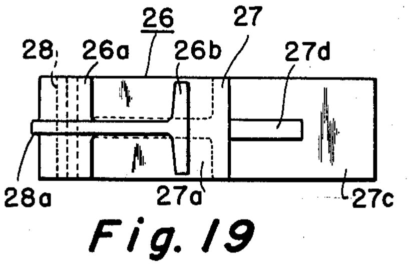
Figure 18:
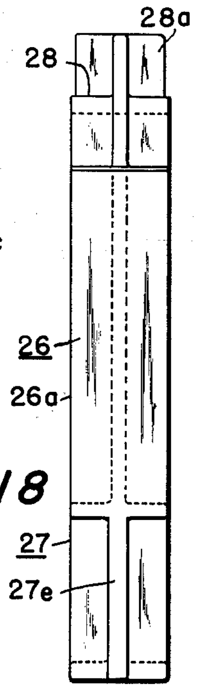
Figure 17:
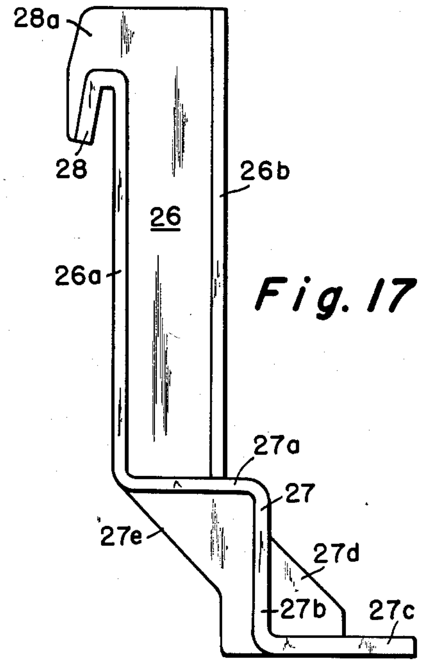
Figure 20:
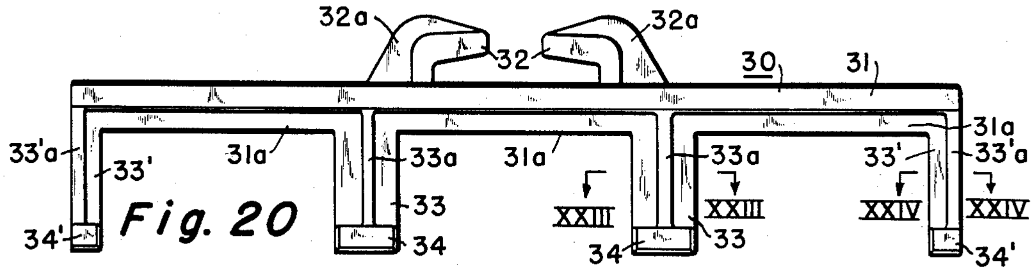
Figure 21:
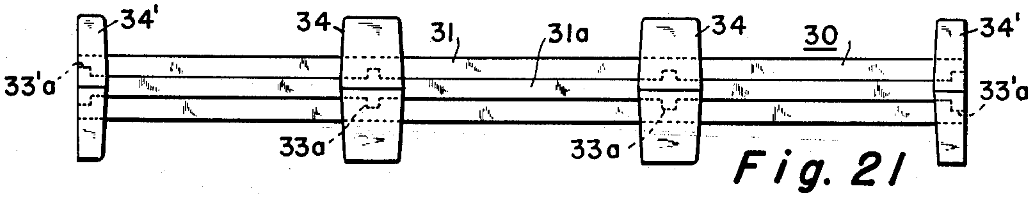
Figure 22:
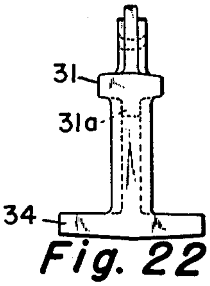
Figure 23:
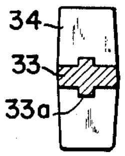
Figure 24:
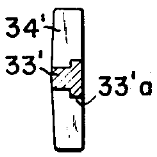

In Figures 7, 8 and 9, I have illustrated radial refractory blocks which are of tapered or pyramidal shape making them suitable for a curved section of a nose portion;

In Figure 7, I have shown a radial refractory block in perspective on the same scale as Figure 4 and of a construction based on the general construction of the rectangular block of Figure 4;

In Figures 8 and 9, I have shown a clad radial refractory block in perspective elevation corresponding in general construction to the rectangular block of Figures 5 and 6; in Figure 9, the block has been turned 180° clockwise with respect to the block of Figure 8;

Figure 10 is a fragmental side view in elevation on the same scale as Figures 3 to 9 and of a refractory block assembly and mounting construction of my invention wherein an end hanger is modified to provide an end support for an end block or a transverse row of end blocks; this view illustrates one phase of the adaptability of my construction;

Figure 11 is a side end view in elevation showing the construction of a nose bracket brace employed in the assembled construction of Figure 1 and is on the same scale as Figures 3 to 10, inclusive;

Figure 12 is a front view in elevation taken at right angles to Figure 11;

Figure 13 is a horizontal section taken along the line XIII—XIII of Figure 11;

Figure 14 is a side view in elevation of a nose bracket employed in the assembled construction of Figure 1 and on the same scale as Figure 11;

Figure 15 is a top plan view of the nose bracket of Figure 14 and Figure 16 is a front end view in elevation of the bracket;

Figure 17 is a side view in elevation of an apron bracket member on the same scale as Figures 11 and 14 and which is employed in the assembled construction of Figure 1;

Figure 18 is a front end view in elevation and Figure 19 is a top plan view of the apron bracket of Figure 18;

Figure 20 is a front view in elevation of a hanger member employed in the assembled construction of Figure 1 and on the same scale as Figure 17 and which is further shown in utilization in Figures 2, 3 and 10;

Figure 21 is a bottom plan view and Figure 22 is a side end view in elevation of the hanger of Figure 20;

Figures 23 and 24 are sectional views taken along the lines XXIII—XXIII and XXIV—XXIV, respectively, of Figure 20.

In Figure 1, particularly in the right half thereof, I have shown roof and radial or curved sections of a nose portion and an apron wall portion as assembled and employing the refractory block, the hanger and the general mounting structure of my invention. In the left half of this figure, I have illustrated the adaptability of the construction of my invention in its utilization with other constructions, such as a fire brick roof construction of the type set forth and described in my Patent No. 2,612,124 of September 30, 1952. In this connection, A represents a cross and I-beam support structure, A′ represents a hanger and cantilever structure, A″ represents a hanger block assembly and A‴ represents a roof block assembly. It will appear from this figure and Figure 10 that the structure of my present invention is readily adaptable for assembly with conventional furnace roof and wall constructions.

In Figure 1, for the purpose of illustration, the basic suspended nose and supported wall portions are shown located in the uptake of an open hearth furnace.

As disclosed in Figure 1, I provide a common load-bearing member or I-beam support 10 for mounting the blocks (rectangular blocks 35′ and radial blocks 38′) of nose and apron wall portions. Both the wall or apron and nose blocks are shown hung on individual hangers 30 as row sets, which may extend transversely of the furnace, and which are built up into adjacent abutting and hanger-spiked-together block rows as two courses or line groups that extend longitudinally of the furnace. Each course or group is supported by a common longitudinally-extending bracket support member 22 or 26. A series of transversely-extending hangers 30 are shown supported or suspended on the inner flange **22*b* or 26*b* of each support member to provide a progressive line series of cross-extending hanger members. It will be noted that I provide separate support members for the nose and wall sections, see the members 22 and 26**.

Hanger members 30 are easily mounted on the flange of their common bracket member (see Figures 2 and 3) by sliding them endwise, as distinguished from twisting them into position thereon. This makes possible assembling a transverse row of blocks on a hanger and then sliding the assembly along a flanged support member to a desired mounted position thereon. In this manner, assemblies may be progressively mounted on the flanged support member, starting at one end of the member and working towards the opposite end thereof.

Further, in accordance with my invention, it is contemplated that a series of transversely-endwise-abutting and longitudinally-extending course or group assemblies will be utilized by providing a series of flanged support members in a transversely-spaced relationship on the main support beam 10, so that the sides of one assembled group of nose or apron blocks will be in close transverse abutment and in an adjacent longitudinal or vertically extending relationship with respect to the furnace, see Figure 1B.

In accordance with my present improved construction, as also shown in Figures 2 and 3, I provide each refractory block with co-operating mouth or socket-defining side grooves or slots, one of which (a corner groove) is open to the outer end or top of the block at one of its corners, the other of which (a side groove) is open from one face of each block to an opposite face thereof (as shown, between major dimension or wide faces of the rectangular blocks of Figures 4 to 6) and to the first-mentioned groove at the corner of each block, and both of which grooves are open along a side of each block (as shown, along a minor dimension or narrow face of the rectangular blocks).

The hanger or integral casting 30 for each row of blocks has a shoulder 31 which is adapted to extend transversely of the flanged support member and to be mounted in a balanced relationship substantially centrally-transversely thereon by means of a pair of slide-guide fingers 32. The hanger has at least one and ordinarily, two, three or four depending or inwardly-projecting block-supporting or mounting parts in a spaced relationship along the length of its shoulder. Each block supporting part has a leg 33 terminating in a block-engaging foot 34 that projects crosswise or at right angles with respect to the shoulder and as shown, longitudinally of the flanged support member. Each block supporting part of the hanger thus has a substantially inverted T-shape, so that its leg 33 may extend along the corner slot or groove of a block and its foot may extend into the side slot or groove of the same block. In this manner, each block is supported off the center of gravity of its mass, so that the blocks of a row carried by one hanger will tend to swing or bias transversely of the furnace towards the next adjacent block of the same row and also, so that such row of blocks will tend to swing (longitudinally of the furnace) towards an adjacent row of blocks of the same line group which is carried by an adjacent hanger and supported on the same flanged support member. It will be apparent that this feature is of value in installing the blocks.

The opposed slide-guide fingers 32 of each hanger 30 have a slightly greater spring than opposite edge portions of flange on which they are mounted to give them play to: (*a*) permit the positioning of blocks of adjacent lines in close abutment, even when the beams or support members are not properly centered; (*b*) allow excess expansion (over and above that permitted by expansion strips) to be transmitted to push out side block of the furnace and; (*c*) provide leeway when metal cladding, etc. has oxidized and thus increased in thickness.

It will be apparent that one hanger carries one row of blocks and that an adjacent or intermediate hanger between adjacent or abutting rows of blocks, as supported by the same flanged support member, co-operates with or engages a pair of abutting or adjacent block rows of the same line group to spike them together by means of its feet 34.

As illustrated particularly in Figure 2, I have shown each hanger 30 provided with a block-supporting part at each end of its shoulder that constitutes about half of intermediate block-supporting parts of the same hanger, so that the end portions of one line group of blocks will lie substantially flush with end blocks and supporting end hanger parts of a second line group to enable the end blocks of transversely adjacent line groups to be positioned in close abutment with each other. This, in effect, makes each row group of a given line group of blocks independent of adjacent transverse line groups from the standpoint of their mounting hangers and their respective flanged support members and facilitates the mounting and dismounting of refractory blocks. It makes possible the use of a common support member 10.

Also, as illustrated in Figure 10 of the drawings, the last hanger 30 of an assembled row group may, if the last row of blocks E′ supported by such hanger has its corner or vertical slot positioned adjacent a furnace wall or roof 41, be provided with only a half a foot 34″ to thus define an inverted L-shaped block-supporting part, rather than an inverted T-shaped part. However, if the other sides of refractory blocks whose corners are unslotted are positioned as end blocks of an end row, see the row E of Figure 1, a special hanger such as shown in Figure 10 is unnecessary.

As shown in Figure 1, the mounting construction of my present invention is highly adaptable in that the horizontal roof and radial sections B and C of the nose portion can be assembled either before or after the apron wall portion D, whichever is more convenient. In any event, I will customarily introduce a hanger 30 and its row of blocks upon the flange of the nose support bracket member 22 downwardly from the upper end thereof so that block rows are assembled in the order E, F. However, this order must be applied in assembling hanger rows on the apron support bracket member 26.

*Structural support*

In Figure 1, I have shown the transversely-extending I-beam member 10 which has an upper flange 10*a* and a lower flange 10*b* for supporting or suspending therealong one longitudinal line of nose and apron portion line groups of my refractory block assemblies including adjacent series of similar longitudinal lines of the furnace construction. To support the apron or wall construction D, I have shown a smaller cross or transversely-extending I-beam member 11 whose web rests and is mounted upon the upper flange 10*a* of the member 10 and which has an outer flange 11*a* and an inner flange 11*b*. As shown particularly in Figure 1 A, a U-shaped saddle 12 is secured by weld metal *w* on the flange 11*b* and as shown in Figure 1, is adapted to be engaged by and to suspend the upper end of the apron bracket or post member 26. A vertical I-beam member 13 is shown projecting upwardly from the beam member 11 and as having an inwardly-projecting angle support member 14 for ordinary wall block 15 of the furnace. A corrugated metal expansion joint member 16 is shown positioned between the wall 15 and a refractory spacer block 17 of rectangular section which is to be supported by the uppermost block row of the line or course assembly of blocks 35 that constitute the apron portion D.

A cross channel member 18 is shown riveted to the bottom flange 10*b* of the I-beam member 10 and has an outer flange 18*a* and an inner flange 18*b*. A nose bracket brace member 19, see also Figures 11 to 13 inclusive, has a hook end portion 20 adapted to latch over the upwardly-projecting outer flange portion 18*a* and also has a bottom foot or flange end portion 21 to be removably secured to an upper or outer flange 22*a* of the nose bracket member 22, as by means of bolt and nut assemblies, see Figure 1. The nose brace member 19 also has an inwardly-projecting lug 19*a* which cooperates with the flange 18*a* of the member 18 and its hook end portion 20 to securely hold it in position on the channel member 18. As shown particularly in Figures 11, 12 and 13, the brace member 19 has a reinforcing rib 19*b* longitudinally along its extent on one side thereof and a reinforcing web portion 19*c* on its other side for the foot portion 21. It will be apparent that the brace member 19, although securely mounted with respect to the cross channel member 18 and the nose bracket member 22, is easily dismounted by removing the bolt and nut assemblies and tilting it outwardly about the flange 18*a* as a pivot point.

As shown particularly in Figures 1 and 14 to 16, inclusive, the nose bracket member 22 corresponds in shape to a right angle bent or curved I-beam member, in that it has the outer flange 22*a* and an inner flange 22*b*. The flange 22*b* serves for mounting the hangers 30, and as shown particularly in Figure 14, is open to opposite ends of the member 22 so as to permit mounting the hangers 30 from either end. At its lower end, the member 22 has a vertical, angle-shaped mounting flange portion 23*a* which is drilled out to receive mounting bolt and nut assemblies, see particularly Figure 1. In this connection, the portion 23 may be employed to support a nose back-up member 25 between a nose roof section B of my construction and an adjacent roof construction, such as shown at the left of Figure 1. The nose bracket member 22, like the nose brace member 19, is constructed for removable mounting and at its upper end has a hook portion 24 which is adapted to latch over the upwardly-projecting inner flange 18*b* of the cross channel 18. The hook 24 is shown as reinforced by a rib 24*a*. It will appear that the nose bracket member 22 serves to mount both the roof section B and the radial or curved nose section C of the nose portion of my refractory block construction.

For mounting and supporting the apron part D of my refractory block apron construction, see also Figures 17, 18 and 19, I have provided the apron or wall bracket or post member 26 which, like the nose bracket member 22, corresponds in shape to an I-beam member, in that it has a web connecting an outer flange 26*a* and an inner flange 26*b*. At its lower end, the member 26 has an angle-shaped part 27 to provide two horizontal steps 27*a* and 27*c*. The first step 27*a* closes off the lower end of the inner flange 26*b* and continues inwardly to define a riser portion 27*b* that connects it with the lower step portion 27*c*, see Figures 1 and 7 to 19 inclusive. As shown in Figure 1, the lower end portion (step portion 27) of the apron bracket member 26 rests upon the upper end portion of the nose bracket member 22.

As shown in Figure 1, the riser portion 27*b* and the lower step portion 27*c* serve to support a rectangular refractory spacer block 17′ and a transversely-extending metal shelf plate 29. It will be noted that the lowermost row of blocks 35 of the apron assembly or portion D rests upon the block 17′ and upon a corrugated metal expansion member 16′. An inner refractory spacer block of rectangular shape 17″ abuts against the outer block 17′, against the corrugated member 16′, and rests upon an uppermost row of blocks 35 of the nose assembly or section C.

As indicated, the apron bracket member 26 is also removably mounted at its upper end by a hook 28 which is adapted to engage within the saddle 12, see also Figure 1A. The bracket member 26 has an upper rib reinforcement 28*a* for its hook 28, an outer rib reinforcement 27*e* for its part 27, and an inner rib reinforcement 27*d* for the same part. As will appear, the hangers 30 are mounted endwise on the flange 26*b* of the post member 26 from its open upper end.

*The hanger construction*

Referring to Figures 1, 2, 3, 10 and 20 to 24, inclusive, the hanger member 30 of my construction which may be an integral casting, has shoulder part 31 that corresponds in length to the length of a transverse row of refractory blocks that are to be suspended or supported thereby. The pair of spaced-apart slide-guide mounting fingers 32 of angle or L-shape project inwardly or downwardly from the shoulder part 31 in an opposed and spaced relationship with respect to each other. The spaced relationship is, as previously explained, slightly greater than the face extent of the inner or bottom flange of the support members 22 or 26 which they are to engage. The fingers 32 are adapted to slide endwise along the flange to guide the hanger and as shown, may position it to extend substantially at right angles to the support member, see Figures 2 and 3. Each finger 32 has a stiffening or reinforcing rib 32*a* as also does the shoulder part 31, see the inner rib 31*a*.

As previously explained, the hanger member 30 has one or more inwardly or downwardly-projecting or depending block-supporting or mounting parts of inverted T-shape consisting of a leg portion 33 which is a continuation of the inner reinforcing rib 31*a* of the shoulder part 31, and a foot portion 34 projecting from opposite sides of the latter portion 33 and at right angles thereto, transversely of the shoulder part 31. End mounts are shown of substantially half the width extent of intermediate mounts for the reasons previously set forth and each has a narrow leg portion 33′ and a narrow foot portion 34′ (see Figure 3). Reinforcing or strengthening ribs 33*a* and 33*a*′ extend downwardly from the shoulder 31 to reinforce the respective legs 33 and 33′.

*Wall and roof block construction*

In Figure 4, I have illustrated a rectangular block 35′ of a magnesite or chrome embodying the features of my invention. In Figures 5 and 6, I have shown a preferred form of block 35 which is metal clad. For simplicity of illustration, I have given corresponding portions of the block 35′ the same numbering as the block 35, but have added prime suffixes.

The refractory body portion of the block 35 of Figures 5 and 6 has been indicated as 36. The upper or outer end of this block is grooved or slotted-out adjacent opposite corners thereof to define hanger-mount receiving mouth or inwardly-offset corner socket portions. Each side slot 36*a* extends horizontally or transversely along and is open to a narrow side face of the block and is also open to opposite wide face sides thereof. A vertical or longitudinal corner slot 36*c* is positioned at opposite corners of the block, taken across one of its major or wide face sides. An upper or outer ledge portion 36*b* is defined at opposite corners of the block from the other wide face side thereof and along the opposite narrow face sides thereof by the slots 36*a* and 36*c*. It will be noted that the mouth or socket portions are on opposite narrow sides of the block and that side slot 36*a* is perpendicular to the corner slot 36*c*.

A metal cladding 37 is shown extending about the side faces of the block and as having a pair of tab portions 37*b* at one end thereof which extend along an outer face of each of the ledge portions 36*b* to reinforce them. The clad metal 37 is shown in Figure 6 as having a joint 37*a*. In this connection, it will be noted that a bottom or inner edge 37*d* of each tab portion 37*b* is substantially flush with a bottom edge 36*d* of each portion 36*b*. In this manner, the block is strengthened at its upper or outer end by the lapping-over of the metal tab portions 37*b* and by the fact that such tab portions are engaged by the foot portions 34 of the hangers 30. In this connection, it will be noted that the ledge portions 36*b*′ of the block 35′ of Figure 4 are of greater depth or thickness extent across the major dimension of the block to provide them with a sufficient refractory support for the foot portions 34.

Figures 2 and 3 illustrate how each hanger 30 is employed to support a series of blocks 35 as a row. Such supported row may then be moved towards a previously assembled group of rows, such as shown to the right of Figure 3, on the flange 22*b* or 26*b* of the same support member 22 or 26 which has not been continued to the right of Figure 3 to avoid confusion.

*The nose block construction*

In Figure 7, I have shown a tapered or pyramidal radial nose block 38′ of basic refractory material. In Figures 8 and 9, I have shown a similar block 38 which is metal clad about its side walls. For simplification of illustration I have designated similar portions of the blocks 38 and 38′ by the same numerals, but by prime suffixes in the case of the block 38′.

Like the rectangular blocks 35 and 35′, the nose blocks have a body of refractory material 39 or 39′ and in the case of the blocks 38 of Figures 8 and 9, a metal cladding 40 about their side walls. Unlike the rectangular block construction, I provide only one corner socket-mouth, as defined by a through side slot 39*a* extending along and open to one if its face sides and open at its ends to opposite face sides, and as defined by a corner slot 39*c* open at its inner end to the slot 39*a* and at its opposite end to the outer end of the block. Both of the slots also define an upper or outer ledge portion 39*b*. Clad metal 40, in addition to extending about the sides of the refractory body 39, has a lapped-over tab portion 40*b* which reinforces or extends along the ledge portion 39*b*. The inner or bottom edge 40*c* of the tab portion 40*b* is in substantial alignment with or lies substantially on the same plane as the bottom edge 39*d* of the ledge portion 39*b*. The joint of the metal cladding 40 is indicated at 40*a* in Figure 9. It will be noted that the transverse slot 39*a* is bounded by inner or bottom faces *a* and *b* which slope inwardly towards each other to a central longitudinal axis of the block and meet in a concave apex *c* to facilitate their radial mounting, see Figure 2.

What I claim is:

1. In an improved furnace construction suitable for roof, nose, apron and wall sections of a high temperature portion of a furnace, the combination of a vertical load-carrying member, a transversely-positioned load-carrying member extending along a lower end portion of said vertical member, a substantially vertical wall block section positioned along an inner side of said vertical load-carrying member, an angle-shaped support portion on the lower end portion of said vertical member and projecting inwardly therefrom to engage a lower portion of said wall block section and support it in position, a nose bracket member having an upper hook portion engaging a lower portion of said transversely-positioned load-carrying member to hang therefrom longitudinally of the furnace, said nose bracket member having an inner flange therealong, a nose and roof block section positioned along an inner side of said nose bracket member, means removably securing said nose-member at its lower end portion to the lower portion of said transversely-positioned load-carrying member to extend longitudinally-vertically and horizontally of the furnace and at substantially right angles to said transversely-positioned load-carrying member, an apron bracket member having an upper hook portion engaging an upper portion of said transversely-positioned load-carrying member to hang substantially longitudinally-vertically therefrom and at substantially right angles to said transversely-positioned load-carrying member, said apron bracket member having a lower portion resting on the upper portion of said nose bracket member, said apron bracket member having an inner flange therealong, an apron block section position along an inner side of said apron bracket member and extending substantially vertically from said wall block section, said apron bracket member having an inwardly projecting arm at its lower end portion to engage a lower portion of said apron block section and support it in position, block hangers slidably mounted in progression along the inner flanges of said nose and apron bracket members to extend transversely thereof and of the furnace, and said apron, nose and roof sections being suspended from said hangers in transverse block rows therealong.

2. In an improved furnace construction suitable for roof, nose and apron sections of a high temperature portion of the furnace, the combination of a transversely-positioned load-carrying member for supporting the sections, said load-carrying member having an upper portion carrying a latching saddle on its inner side and having a lower portion carrying latching projections on its inner and outer sides, a nose bracket member of curved shape having an inner flange therealong, said nose bracket member having an upper hook portion latching over and engaging the inner latching projection of said load-carrying member to suspend said nose bracket member therefrom, a latching member removably secured to a lower end portion of said nose bracket member and projecting upwardly therefrom to engage the outer latching projection of said load-carrying member to position said nose bracket member to extend longitudinally-horizontally and vertically of the furnace and at substantially right angles to said load-carrying member, an apron bracket member having an inner flange therealong, said apron bracket member having an upper hook portion engaging within the saddle of said load-carrying member to suspend said apron bracket member substantially vertically-longitudinally with its lower end portion resting upon an upper portion of said nose bracket member, a series of block hangers having means slidably supporting them in progression along the inner flanges of said nose and apron bracket members to extend transversely thereof and of the furnace, and refractory blocks suspended from said hangers to project inwardly of the furnace in transverse block rows with respect to said nose and apron bracket members.

3. An improved furnace construction as defined in claim 2 wherein, each of said hangers have transversely spaced-apart leg portions depending therefrom, a foot portion having feet projecting outwardly from opposite sides of a lower end of each of said leg portions, said leg portions, said leg portions depend along offset joints between adjacent blocks of said transverse block rows, the feet on one side of said leg portions latch within the blocks of one transverse block row, and the feet on the opposite side of said leg portions latch within the blocks of the adjacent transverse block row, so that a series of blocks or adjacent transverse block rows are suspended from each of said hangers.

4. In an improved refractory block assembly for mounting on a longitudinal flange of a support member, the combination of a hanger member having a transversely-projecting shoulder part, said shoulder part having an extent substantially corresponding to the length of a transverse group of blocks to be suspended from said hanger member, slide finger means projecting from said shoulder part to slidably engage over opposed longitudinal edge portions of the flange of the support member, at least a pair of block suspending parts in a spaced-apart relationship along said shoulder part and each comprising a depending leg portion and a foot portion projecting from at least one side of said leg portion, a group of blocks positioned in a transverse row along said hanger member, each of said blocks having a shaped refractory body having side corners and being provided with at least one socket adjacent its upper end, said socket having a cross slot portion extending along one side of the block in a downwardly-spaced relationship with the upper end of the block to receive the foot portion of one of said block suspending parts and also having a corner slot portion extending along a corner of the block from its upper end downwardly into said cross slot portion to receive the leg portion of said one block suspending part, said cross and corner slot portions defining an upper ledge portion on such side of the block to support the block on said block suspending part, and the blocks of said group being positioned in a side-by-side abutting relationship and with the sockets of an adjacent pair of blocks in an opposed and complementary relationship with each other to receive a common one of said block suspending parts therebetween and in the defined manner within their opposed sockets and suspend said pair from the common block suspending part.

5. A block assembly as defined in claim 4 wherein, said foot portion projects from opposite sides of said leg portion of each of said block suspending parts, a second group of blocks are positioned in a transverse row along said hanger member and in an abutting relationship along said first mentioned group, said second group are of substantially the same defined construction and positioned relationship as said first group, said second group has an adjacent pair of blocks with their sockets in the same opposed and complementary relationship with each other as said adjacent pair of said first group, and the opposed sockets of said first and second group are in an opposed and complementary relationship with each other to receive the common block suspending part and suspend the pairs of said first and second group from the common block suspending part.

6. In an improved block assembly for mounting on a longitudinal flange of a support member, the combination of a hanger member having a transversely-projecting shoulder part, said shoulder part having an extent substantially corresponding to the length of a transverse row of blocks to be suspended from said hanger member, slide finger means projecting from said shoulder part to slidably engage over opposed longitudinal edge portions of the flange of the support member, at least a pair of block suspending parts in a spaced-apart relationship along said shoulder part and each comprising a depending leg portion and a foot portion having a foot projecting from one side wall of said leg portion and an oppositely-positioned foot projecting from the opposite side of said leg portion, at least a pair of block groups positioned in adjacent transverse rows along said hanger member, each of said blocks having a shaped refractory body having side corners and being provided with at least one socket adjacent its upper end, said socket having a cross slot portion extending along one side of the block in a downwardly spaced relationship with the upper end of the block to receive the foot portion of one of said block suspending parts and also having a corner slot portion extending along a corner of the block from its upper end downwardly into said cross slot portion to receive the leg portion of said one block suspending part, said cross and corner slot portions defining an upper ledge portion on such side of the block to support the block on said suspending part, adjacent blocks of one of said transverse rows being positioned in a side-by-side abutting relationship with the adjacent blocks of the other transverse row to define adjacent block pairs between said rows; each said adjacent pair being positioned longitudinally of the assembly and with their sockets in an opposed and complementary relationship with each other to receive a common one of said block suspending parts therebetween, with the leg portion of said one suspending part along their corner slots, with the foot of the foot portion of said one suspending part along the cross slot of one block of said pair and with the other foot of the said foot portion along the cross slot of the other block of said pair to suspend said block pair from said common one of said block suspending parts.

7. A block assembly as defined in claim 6 wherein, a metal cladding is positioned about the refractory body of each of said blocks, and said cladding has a tab along said ledge portion.

8. A block assembly as defined in claim 6 wherein, one of said block suspending parts is mounted at one end of said shoulder part and is of substantially half the thickness of the other suspending part of said pair, and said part of half thickness is positioned within opposed sockets of an adjacent pair of end-positioned blocks and in a substantially flush relationship with respect to corresponding sides of said adjacent pair of end blocks.

9. An improved support system for refractory furnace blocks which comprises, a support member having a longitudinally-extending flange therealong, a group of block hanger members in a longitudinally spaced-apart relationship with each other along the support member, each of said hanger members having a shoulder part that projects transversely of the longitudinal flange of the support member, said shoulder part having an extent sufficient to suspend a transverse row of blocks therefrom, a pair of transversely spaced-apart angle-shaped support fingers projecting upwardly from said shoulder part substantially centrally thereof and in a spaced relationship towards each other to slidably engage over opposed longitudinal edge portions of the flange of the support member, so that each of said hanger members may be slid longitudinally along the flange of the support member, a group of block suspending parts in a transversely spaced-apart relationship along each said shoulder part, and each suspending part comprising a depending leg portion and a foot portion having feet projecting from opposite sides of said leg portion and at substantially right angles to said shoulder part.

10. An improved hanger member for mounting refractory block pairs from their sockets on a longitudinally-extending flange of a support member which comprises, a transversely projecting shoulder part, a pair of centrally disposed and transversely spaced-apart angle-shaped fingers projecting upwardly from said shoulder portion and towards each other to slidably engage over opposed longitudinal edge portions of the flange of the support member for slidably positioning said shoulder part for endwise movement along the flange of the support member, block suspending parts projecting downwardly from said shoulder part and positioned in a balanced spaced-apart relationship along said shoulder part, and each of said block suspending parts having a leg portion and a foot portion, said foot portion projecting in a direction that is substantially at right angles to said shoulder portion from opposite sides of said leg portion to engage sockets of the refractory block pairs for suspending them.

11. A hanger member as defined in claim 10 wherein, said fingers lap over the opposite longitudinal edges of the flange, and a pair of said block suspending parts are located at opposite ends of said shoulder part and have substantially half the thickness of intermediate block supporting parts to lie substantially flush within the sockets of the refractory blocks.

12. An improved refractory block for row mounting on a pair of leg and foot portions of a hanger which comprises, a shaped refractory body provided with at least one socket adjacent its upper end, said socket having a foot-receiving cross slot portion extending along one side of the block in a downwardly spaced relationship with the upper end of the block, said socket also having a leg-receiving corner slot portion extending along a corner of the block from its upper end downwardly into said cross slot portion, and said cross and corner slot portions defining an upper ledge portion on such side of the block to support the block when it is suspended by the leg and foot portions.

13. A refractory block as defined in claim 12 wherein said shaped refractory body has tapered sides.

14. An improved refractory block as defined in claim 12 wherein a metal cladding is positioned about side faces of said body and has a metal tab along said ledge portion to reinforce said body when it is suspended from said socket.

15. A refractory block as defined in claim 12 wherein a metal tab is positioned along said ledge portion and has a lower edge along said cross slot that is in substantial alignment with a lower edge of said ledge portion that lies along said cross slot portion.

16. A refractory block as defined in claim 12 wherein, a second socket for receiving a second pair of leg and foot portions of the hanger is provided along an opposite side of the block and said socket has a cross slot portion extending along the opposite side of the block in a downwardly spaced relationship with the upper end of the block, and also has a corner slot portion extending along an opposite corner of a block from its upper end downwardly into said second cross slot portion.

17. A refractory block as defined in claim 16 wherein said refractory body is of substantially rectangular shape and said sockets are positioned on opposite narrow sides of said body.

18. A refractory block as defined in claim 16 wherein, a metal cladding is positioned tightly about the sides of said refractory body and has tab portions projecting therefrom along sides of said ledge portions to reinforce them when the block is supported thereby.

19. A bracket member for positioning a plurality of refractory block hangers in longitudinal progression therealong and to be suspended from and at substantially right angles to a load-carrying member having an offset portion which comprises, a longitudinally-extending web part having a longitudinally-extending flange part along its outer side and a longitudinally-extending flange part along its inner side, a hook part projecting from an upper end of the bracket member and outwardly from said outer flange part to engage the offset portion of the load-carrying member and suspend the bracket member therefrom, an angle-shaped step part positioned at a lower end of the bracket member and projecting inwardly from its outer flange part along its web part and inwardly from its inner flange part, and said step part having right-angle inner and outer step portions connected by a riser portion, said outer step portion providing a bottom stop for block suspending hangers to be carried by said inner flange part, and said riser and the inner step portions providing a mounting for a filler block to close off spacing between said inner flange part and blocks carried by the hangers.

20. A bracket structure for positioning a plurality of refractory block hangers in longitudinal progression therealong and to be suspended from and at substantially right angles to a load-carrying member having inner and outer offset portions which comprises, a bracket member having a longitudinally-extending web part, a longitudinally-extending flange part along an outer side of said web part and a longitudinally-extending flange part along its inner side; a hook part projecting from an upper end of the bracket member and outwardly from said outer flange part to engage the inner offset portion of the load-carrying member and suspend the bracket member therefrom; a brace member having an upper hook part to engage the outer offset portion of the load-carrying member, and the brace member projecting downwardly from its said hook part and being removably secured to a lower end of the bracket member by said outer flange part of the bracket member for securely positioning the bracket member on the load-carrying member.

References Cited in the file of this patent

UNITED STATES PATENTS

| | | |
|---|---|---|
| 1,541,441 | Stimmel | June 9, 1925 |
| 1,626,982 | Strachota | May 3, 1927 |
| 1,628,284 | Stevens | May 10, 1927 |
| 1,628,318 | Hosbein | May 10, 1927 |
| 1,879,406 | Moreau | Sept. 27, 1932 |
| 1,977,799 | Longenecker | Oct. 23, 1934 |
| 2,132,517 | Reintjes | Oct. 11, 1938 |
| 2,163,435 | Pollen | June 20, 1939 |
| 2,216,813 | Gold Schmidt | Oct. 8, 1940 |
| 2,548,908 | Pollen | Apr. 17, 1951 |
| 2,593,481 | Over | Apr. 22, 1952 |

FOREIGN PATENTS

| | | |
|---|---|---|
| 297,271 | Great Britain | Sept. 20, 1928 |
| 600,649 | Great Britain | Apr. 14, 1948 |